(12) United States Patent
Hofmann et al.

(10) Patent No.: US 7,516,937 B2
(45) Date of Patent: Apr. 14, 2009

(54) DEFORMABLE MOLDS AND METHODS FOR THEIR USE IN THE MANUFACTURE OF OPHTHALMIC LENSES

(75) Inventors: Gregory J. Hofmann, Jacksonville Beach, FL (US); Thomas R. Rooney, Jacksonville, FL (US); David Pearson, Hudson, MA (US); Zaffir A. Chaudhry, South Glastonbury, CT (US); Jacqueline M. Roche, Lunenburg, MA (US); Jeffrey H. Roffman, Jacksonville, FL (US); Larry G. Jones, Jacksonville, FL (US); Mark A. Ealey, Littleton, MA (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 863 days.

(21) Appl. No.: 10/881,773

(22) Filed: Jun. 29, 2004

(65) Prior Publication Data

US 2005/0056953 A1    Mar. 17, 2005

Related U.S. Application Data

(63) Continuation-in-part of application No. 09/649,635, filed on Aug. 28, 2000, now Pat. No. 6,830,712.

(51) Int. Cl.
*B29D 11/00* (2006.01)

(52) U.S. Cl. .................. 249/155; 425/808; 249/82; 74/519; 74/834

(58) Field of Classification Search .................. 425/174, 425/385, 808; 249/82, 117, 160, 165, 155; 264/1.1, 1.32, 1.36, 2.5, 40.1, 313, 402, 2.7, 264/40.3; 74/834, 38, 40, 45, 66, 101, 102, 74/118, 141.5, 490.14, 519, 529; 700/197
See application file for complete search history.

(56) References Cited

U.S. PATENT DOCUMENTS

| | | | |
|---|---|---|---|
| 4,277,276 A | | 7/1981 | Kellar et al. |
| 4,349,375 A | | 9/1982 | Kellar et al. |
| 4,470,835 A | | 9/1984 | Fecik et al. |
| 4,940,318 A | * | 7/1990 | Ealey et al. .................. 359/849 |
| 5,037,184 A | * | 8/1991 | Ealey .......................... 359/849 |
| 5,414,565 A | * | 5/1995 | Sullivan et al. ............. 359/872 |
| 5,702,733 A | | 12/1997 | Enami |
| 5,880,896 A | | 3/1999 | Ishii et al. |
| 6,086,204 A | | 7/2000 | Magnante |

(Continued)

FOREIGN PATENT DOCUMENTS

| EP | 318164 | 5/1989 |
|---|---|---|
| JP | 4-284208 | 10/1992 |

OTHER PUBLICATIONS

Enrique J. Fernandez and Pablo Artal, "Membrane Deformable Mirror for Adaptive Optics: Performance Limits in Visual Optics," Optics Express, Apr. 25, 2003, vol. 11, No. 9, pp. 1056-1069.

*Primary Examiner*—Philip C Tucker
*Assistant Examiner*—Dimple N Bodawala (57) ABSTRACT

The present provides deformable molds and methods for manufacturing ophthalmic lenses using deformable molds. The molds of the invention may be used in the custom manufacture of ophthalmic lenses.

18 Claims, 8 Drawing Sheets

U.S. PATENT DOCUMENTS

| | | | |
|---|---|---|---|
| 6,514,436 B1 * | 2/2003 | Dobner | 264/1.1 |
| 6,558,590 B1 * | 5/2003 | Stewart | 264/40.5 |
| 6,827,325 B2 * | 12/2004 | Hofmann et al. | 249/134 |
| 6,830,712 B1 * | 12/2004 | Roffman et al. | 264/1.38 |
| 7,081,219 B2 * | 7/2006 | Stewart | 264/40.5 |
| 2004/0100704 A1 | 5/2004 | Shaddock | |

* cited by examiner

DEFORMABLE MOLDS AND METHODS FOR THEIR USE IN THE MANUFACTURE OF OPHTHALMIC LENSES

This application is a continuation-in-part of, U.S. Ser. No. 09/649,635 filed on Aug. 28, 2000, now issued as U.S. Pat. No. 6,830,712.

FIELD OF THE INVENTION

The present invention relates to the manufacture of ophthalmic lenses. In particular, the invention provides deformable molds and methods for manufacturing ophthalmic lenses using deformable molds.

BACKGROUND OF THE INVENTION

The use of ophthalmic lenses, including spectacle lenses, contact lenses, intraocular lenses, and the like for the correction of ametropia is well known. Production of the lenses requires the use of molds that impart the desired corrective characteristics onto the lens surfaces. Typically, a large inventory of molds is required corresponding to each sphere, add, and cylinder power and combinations thereof desired for the finished lens. Production and maintenance costs for the mold inventory are high. Therefore, a need exists for a mold to produce ophthalmic lenses that permits reduction of mold inventory.

DESCRIPTION OF THE INVENTION AND ITS PREFERRED EMBODIMENTS

The present invention provides deformable molds, and methods using the molds, for producing ophthalmic lenses. The invention permits the production of a full prescriptive range of lenses while reducing the number of molds required. Further, the molds of the invention may be used in a method for the delivery of customized ophthalmic lenses to a lens wearer.

In one embodiment, the invention provides a mold for use in the manufacture of ophthalmic lenses comprising, consisting essentially of, and consisting of: a.) at least one mold half comprising, consisting essentially of, and consisting of a non-molding surface and a molding surface, wherein at least a portion of the molding surface is capable of being reversibly deformed; and b.) adjustment means for reversibly deforming the deformable portion of the molding surface. For purposes of the invention, by "ophthalmic lens" is meant a spectacle lens, a contact lens, an intraocular lens, or the like.

The non-molding surface of the mold half is contacted with the adjustment means and the molding surface contacts an ophthalmic lens-forming material. At least a portion of the molding surface is capable of being reversibly deformed and has a first shape that may be of any shape, but conveniently is of a concave or convex shape having a first radius of curvature $R_1$. This deformable portion of the molding surface is capable of being reversibly deformed by action of the adjustment means against the non-molding surface so that the deformable portion assumes a shape that is desired to be imparted to at least a portion of one surface of the ophthalmic lens to be produced in the mold. The assumed shape is such that it can impart the desired optical characteristics to the lens.

By "optical characteristics" is meant one or more of spheric, aspheric, toric, or cylindric curvature, high order aberration correction, corneal topography aberration corrections, and the like and combinations thereof. The optical characteristic imparted will depend on the aberrations of the lens wearer's eye desired to be corrected. The mold of the invention is suitable for producing lenses for correction of either or both low and high order wavefront aberrations of the eye, meaning any departure from a spherical wavefront. These aberrations include, without limitation, astigmatism, defocus, coma, spherical aberrations, distortion, and the like. These aberrations may be mathematically defined using known methods including, without limitation, using Zernike polynomials.

The molding surface may be formed by any material capable of being reversibly deformed, capable of withstanding the stresses imposed by the lens manufacturing process selected and capable, when deformed, of maintaining a shape suitable for imparting the desired optical characteristics to the lens surface to be molded. If the lens is to be formed using an ultra-violet or visible light cure, the material preferably is transmissive of light between about 250 and 500 nm. Additionally, the molding surface must be compatible with the material from which the lens is to be molded. Factors for determining whether the mold surface material is compatible include, without limitation, whether the material adheres to the lens-forming material and whether the material chemically reacts with the lens-forming material.

Suitable molding surface materials include, without limitation, metals, polymers, metalized polymers and the like and combinations thereof. Exemplary of these materials are: aluminum, gold, brass, and nickel metals; polyolefin polymers including, without limitation, polyethylene and polypropylene, polyethylene terphthalate; poly(vinylidene fluoride); poly(vinyl chloride); polystyrenebutadiene; silicone polymers; electro-active polymers such as polyanilines, polypyrroles, ion exchange polymer metal matrix compositions and the like; shape-memory polymers such as segmented polyurethanes, norbornene homopolymers and copolymers of norbornene and alkylated, cyano, alkoxylated, mono- or diesterified imides, or carboxylic acid derivatives and the like; shape-memory alloys such as nitinol, and the like; ceramics such as silicon carbide; and combinations thereof. These materials are commercially available or methods for their production are known.

The molding surface must have an optical quality surface finish meaning that it is sufficiently smooth so that a lens surface formed by the polymerization of a lens forming material in contact with the molding surface is optically acceptable. The non-molding surface need not have an optical quality finish. However, the non-molding surface must be sufficiently pliant, flexible, and durable to enable its repeated contact with, and action upon it by the adjustment means selected.

The size, shape, and thickness of the molding surface, singly or in combination with the non-molding surface, will be dependent on the type of lens to be produced. Preferably, the molding surface, singly or in combination with the non-molding surface, is in the form of a membrane, more preferably a polymeric membrane. In a most preferred embodiment, the molding surface is a membrane of a size and shape suitable for production of a soft contact lens and is about 0.5 to about 5000, preferably 1 to about 1000 microns in thickness.

Adjustment means contact the non-molding surface of the mold of the invention under conditions suitable to deform the deformable portion of the molding surface to the desired shape. Adjustment means may be any means capable of manipulating and deforming the deformable portion of the molding surface to the degree necessary to obtain the desired molding surface configuration. Examples of such adjustment means include, without limitation, fluids, micro-actuators, such as piezo-electric, micro-motorized, or hydraulic micro-actuators, magneto-restrictive actuators, electro-static actuators, elector-restrictive actuators, electro-active polymers, and the like that move in response to an input signal. For example, by varying the voltage applied to a series of piezo-electric micro-actuators, the deformable portion of the molding surface may be displaced so that it assumes a desired shape.

Preferably, the actuators are made of a suitable electro-restrictive material including, without limitation, lead-magnesium-niobate, lead-magnesium-niobate-titanate, and electrorestrictive polymers including, without limitation, poly (vinylidene fluoride-trifluorethylene), and the like and combinations thereof.

In embodiments in which micro-actuators are used, spacing of the actuators may be determined by the resolution requirement of the lens surface to be formed. The resolution requirements will be determined by the features desired to be imparted onto the lens surface. The adjustment means may be used in combination with heat to alter the molding surface's shape. In this embodiment, heat is used so as to raise the temperature of the molding surface to above its glass transition temperature, the heat being provided into the mold by any convenient known means. However, it is preferred that only the adjustment means are used.

As an alternative to the micro-actuators, the adjustment means may be a mechanical magnetic field deformation means. In this embodiment, a first magnetic surface contacts the non-molding surface. Preferably, the magnetic surface is of a shape that is complementary to the non-molding surface. The magnetic surface may be constructed of any magnetic material capable of withstanding the molding process environment and, preferably, is of a material that is capable of being physically or chemically bonded to the non-molding surface. Suitable materials include, without limitation, magnetic ferrous steels, cast or sintered alnicos, bonded or sintered ferrites, lodex, P-6 alloy, cunife, cunico, vicalloy, remalloy, platinum cobalt, cobalt-rare earth blends, and the like and combinations thereof.

A second magnetic surface is brought into sufficient proximity to the first magnetic surface to exert a magnetic force upon the first surface that is effective to impart a desired shape to the first magnetic surface and, through that surface, to the molding surface. The second magnetic surface may be positioned by any convenient positioning means including, without limitation, a robotic arm, a gripper, an adjustable mechanical arm, or the like or a combination thereof. Either or both the first and second magnetic surfaces may be a formed of a series of electromagnets.

Conditions suitable to deform any of the adjustments means used in the invention will depend upon a number of factors. These factors include the type of adjustment means used, the materials selected to form the molding and non-molding surfaces, and the shape desired to be imparted to the lens surface by the molding surface.

In the molds of the invention, input signals to the adjustment means may be, and preferably are, the distortions or aberrations of the eye for which the lens is being manufactured to correct. Clinical wavefront sensors, such as aberroscopes, Hartmann-Shack devices and mirror arrays capable of measuring these high order aberrations, as well as conventional low order aberration measurement equipment such as a phoropter, are commercially available. The wavefront data, or measured aberrations, may be represented by a set of mathematical coefficients, such as Zernike coefficients, that may be used to form the input signals that drive the adjustment means. The adjustment means contact a portion or the whole of the non-molding surface and, by action on that surface, deform the deformable portion of the molding surface so that the surface is capable of imparting one or more optical characteristics onto all or a portion of a surface of the lens to be formed within the mold. Configuration of software suitable for processing and inputting the signals for purposes of driving the adjustment means is within the skill of one ordinarily skilled in the art.

The data obtained through the use of the wavefront sensors may be reported in mathematical, as for example by Zernike coefficients. This data then is converted mathematically into an elevation map above and below a designated mean sphere value to obtain the optical path difference. These elevations are then used to determine the shape to be imparted to a surface of the lens. For the manufacture of contact lenses, these elevations preferably will be used to determine the shape of the front or object side surface of the lens.

In addition to optical characteristics, the molding surface may be used to impart a geometry to a surface of a contact lens that substantially inversely corresponds with that of the lens wearer's cornea. This function of the mold of the invention may find its greatest utility in the manufacture of contact lenses. The corneal topographic data for the lens wearer may be acquired using conventional topographers. Preferably, these data are used to produce a back surface design for a contact lens that is a substantial mirror image of the corneal topography. By "mirror image" is meant that the back surface substantially inversely corresponds to the corneal topography and is superimposable on the corneal topography. Alternatively, the data may be applied to a soft contact lens model in an unflexed state and then by taking into account lens flexure when the lens is placed onto the wearer's eye.

For contact lenses, preferably, corneal data is used to determine the elevation map of the lens' back surface. Mapping of the corneal elevation onto the lens surface may be carried out by any known method. For soft contact lens production, preferably, mapping is carried out so that the error introduced by flexure of the lens is minimized. In this method, the corneal elevation data is applied to a soft contact lens in the unflexed state. The elevation data is then transformed by taking into account lens flexure.

In this method, for practical considerations, it is assumed that the ideal cornea is spherical and that the actual corneal elevations and their best spherical fit are denoted f(x) and g(x), the function g(x) being part of a sphere having radius $R_a$. In general, the radius $R_b$ of an unflexed soft contact lens is spherical and is larger than that of the best spherical fit g(x). The first step is to transform the corneal elevations f(x) into a larger scale for which the best spherical fit will have a radius equal to $R_b$. One approach in simplifying the transformation is to represent the function f(x) in polar coordinates as f(θ). Then using the scale factor $\alpha = R_b/R_a$, the scaled version of the corneal elevation may be expressed as $$f^{(1)}(\theta) = \alpha f(\theta) \quad \quad (I)$$

In the second stage, the scaled corneal elevation, f(θ), is scaled down so that the area covered by the soft contact lens corresponds to the area of the cornea. In a two dimensional case, this scaling down is obtained according to the following relationship:

$$f^{(2)}(\theta) = \alpha^{-1} f^{(1)}[(\theta - \pi/2)/\alpha + \pi/2] + R_b(1 - 1/\alpha) \quad \quad (II)$$

The mapping transformations given in the above equations are not restricted to the case in which the cornea and the back surface of the contact lens are spherical. Rather, the true corneal and lens curvatures may be used to calculate the scale parameter α as a ratio between the lens and the corneal radius of curvature. In the general case, the scale parameter will be a function of θ, i.e., $\alpha = R_b(\theta)/R_a(\theta) = \alpha(\theta)$.

The mapping transformation discussed above may be generalized to the case of three dimensional transformation. In such a case, the corneal elevations may be represented by a function, f(θ,φ) where θ and φ represent the azimuth and elevation angle, respectively. The original elevation data is scaled up from the radius of curvature $R_a(\theta,\phi)$ using the following transformation relationship:

$$f^{(1)}(\theta,\phi) = \alpha f(\theta,\phi) \quad \quad (III)$$

where $\alpha = R_b(\theta,\phi)/R_a(\theta,\phi)$.

To obtain a desired back surface of the lens, the functional $f^{(1)}(\theta,\phi)$ is scaled back down. However, in the three dimensional case, there are a number of options to choose from in performing the scaling operation such that the area is preserved. For example, if it is assumed that the deformation of the material is uniformly radial, the scaling mat be performed by scaling the elevation angle only, leaving the original azimuth angle. This is expressed in the following relationship:

$$f_{(2)}(\theta,\phi) = \alpha^{-1} f^{(1)}[\theta,(\phi - \pi/2)/\alpha + \pi/2] + R_b(1 - 1/\alpha) \quad \quad (IV)$$

Once the molding surface is deformed to the desired shape, the surface may be used to mold the desired lens. Therefore, in another embodiment, the invention provides a process for manufacturing an ophthalmic lens comprising, consisting essentially of, and consisting of the steps of: a.) providing a mold, at least one half of the mold comprising, consisting essentially of and consisting of (i.) a non-molding surface and a molding surface, wherein at least a portion of the molding surface is capable of being reversibly deformed and (ii.) adjustment means for reversibly deforming the deformable portion of the molding surface; b.) deforming the deformable portion of the molding surface to a shape suitable for imparting one or more optical characteristics onto a lens surface; c.) depositing a lens-forming material on the molding surface mold; and d.) curing the lens-forming material under conditions suitable to form the ophthalmic lens.

Lens-forming material may be deposited on the molding surface by any suitable means. The volume of lens-forming material dispensed into the cavity will be a lens forming amount which is an amount effective to form the desired ophthalmic lens. Typically, the amount of material deposited used will be about 0.01 mg to about 100 g.

The lens-forming material may be any material suitable for forming an ophthalmic lens. Exemplary spectacle lens-forming materials include, without limitation, polycarbonates, such as bisphenol A polycarbonates, allyl diglycol carbonates, such as diethylene glycol bisallyl carbonate (CR-39™), allylic esters, such as triallyl cyanurate, triallyl phosphate and triallyl citrate, acrylic esters, acrylates, methacrylates, such as methyl-ethyl- and butyl methacrylates and acrylates, styrenics, polyesters, and the like and combinations thereof. Additionally, the lens forming material may be one or more of the phosphine oxides disclosed in U.S. Pat. No. 6,008,299 incorporated herein in its entirety by reference.

Suitable lens-forming materials for contact lenses are any materials useful for forming hard or soft contact lenses. Preferably, the lens-forming material is suitable for forming a soft contact lens. Illustrative materials for formation of soft contact lenses include, without limitation silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the material is a siloxane, or contains a siloxane functionality, including, without limitation, polydimethyl siloxane macromers, methacryloxypropyl polyalkyl siloxanes, and mixtures thereof, silicone hydrogel or a hydrogel, made of monomers containing hydroxy groups, carboxyl groups, or both or be made from silicone-containing polymers, such as siloxanes, hydrogels, silicone hydrogels, and combinations thereof. Materials for making soft contact lenses are well known and commercially available. Preferably, the material is acquafilcon, etafilcon, genfilcon, lenefilcon, senefilcon, balafilcon, lotrafilcon, or galyfilcon.

Suitable materials for forming intraocular lenses include, without limitation, polymethyl methacrylate, hydroxyethyl methacrylate, inert clear plastics, silicone-based polymers, and the like and combinations thereof.

Curing of the lens forming material deposited within the mold may be carried out by any means known including, without limitation, thermal, irradiation, chemical, electromagnetic radiation curing and the like and combinations thereof. Preferably, molding is carried out using ultraviolet light or using the full spectrum of visible light.

More specifically, the conditions suitable for curing the lens-forming material will depend on the material selected and the lens to be formed. For formation of spectacle lenses, a preferred curing condition is a two-stage UV cure in which the mold assembly is exposed to low intensity and then high intensity ultraviolet light. Low intensity UV light is UV light with an intensity of about 0.5 to about 50, preferably about 1 to about 5 mW/cm². High intensity UV light is of an intensity of about 50 to about 2000, preferably 500 to about 1500 mW/cm². The wavelengths at which the exposures are carried out may be, and preferably are, the same. Suitable wavelengths are about 300 to about 450, preferably about 360 to about 400 nm. The time for the low intensity exposure will depend on the lens-material selected, the type and amount of any initiator used, material viscosity and the nature of its reactive groups, and the intensity of the UV light. Subsequent to the termination of the low intensity exposure, the mold assembly is exposed to high intensity UV light under conditions suitable to complete through-cure of the lens-forming. The same factors determinative for low intensity exposure time are determinative for the high intensity exposure time. Both high and low intensity exposure may, and preferably are, carried out as single, continuous exposures. However, the exposures also may be carried out using alternating periods of UV exposure and non-exposure periods. The low and high intensity polymerization steps may be carried out at a temperature between about 10 to about 50° C. and atmospheric pressure, preferably at ambient temperature. The UV exposure may be used alone or in combination with heat.

Polymerization processes for contact lenses are well known. Suitable processes are disclosed in U.S. Pat. No. 5,540,410 incorporated herein in its entirety by reference. For formation of contact lenses, a preferred curing condition is to pre-cure the mold assembly using UV light with an intensity of about 2 to about 10 mW/cm$^2$. Following the pre-cure, the mold assembly is exposed to UV light of an intensity of about 0 to about 4.0 mW/cm$^2$. Suitable wavelengths are about 300 to about 500 nm. The time for the low intensity exposure will depend on the lens-material selected, the type and amount of any initiator used, material viscosity and the nature of its reactive groups, and the intensity of the UV light. Both pre-cure and subsequent UV exposure may, and preferably are, carried out as single, continuous exposures. However, the exposures also may be carried out using alternating periods of UV exposure and non-exposure periods. The polymerization steps preferably is carried out at a temperature between about 40 to about 75° C. and atmospheric pressure preferably under a blanket of nitrogen gas. Total cure time is between about 300 to about 500 seconds.

Once the curing is completed and the formed lens is removed from the mold, the adjustment means may be manipulated so that the molding surface returns to its original shape or assumes another shape for use in molding of a lens of another prescription. Alternatively, in the case that the molding surface is a polymeric membrane, all or a portion of the molding surface first may be deformed by the adjustment means, heated to above the molding surface material's Tg, subsequently cooled, and then used in lens molding. The cooled molding surface may be removed from the adjustment means for use. Once molding is completed, the molding surface may be disposed of or, and preferably, reused by use of heat and the adjustment means to configure the surface to the original shape or another desired shape.

Figure 1:
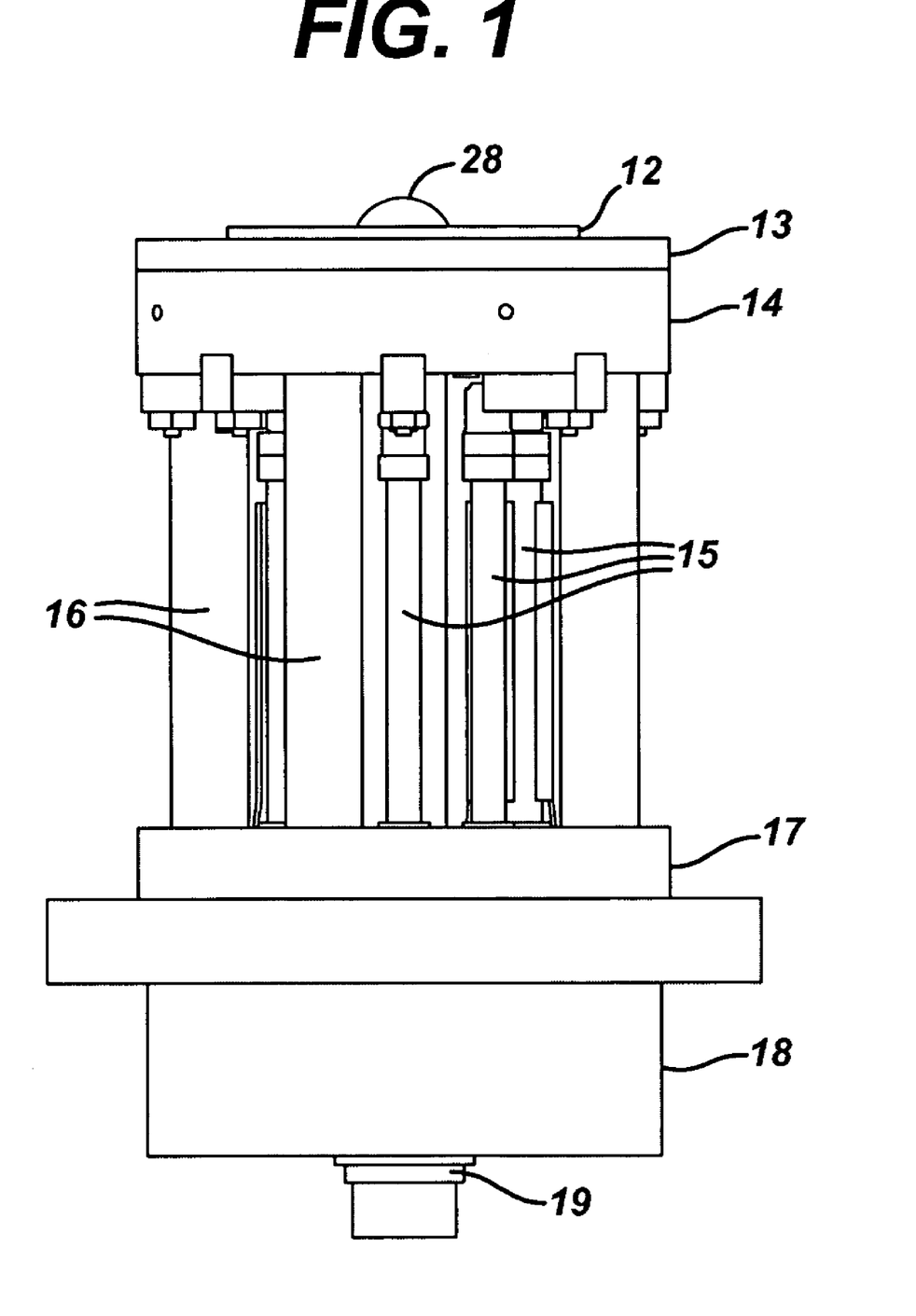
FIG. 1 is a plan view of a mold of the invention.

In FIG. 1 is depicted a preferred mold half of the invention. An outer cover, which is not shown, preferably surrounds the mold half. The mold half includes flexure mounting plate 14 and mounting plate 17 which are connected by a plurality of standoffs 16. Mold tray 12, which holds lens casting cup 28, is mounted onto flexure mounting plate 14. Clamping plate 13 is attached to mold tray 12 and clamping plate 13 holds mold tray 12 against lens casting cup 28. Mounting plate 17 is seated within back cover 18. An electrical connector 19 extends outwardly from the inferior-most portion of back cover 19. Electrical links to the micro-actuators 15 are fed through back cover 18 into electrical connector 19. For purposes of attaching mold parts together, preferably nuts, bolts, machine screws, tapped holes, and the like are used.

Figure 2:
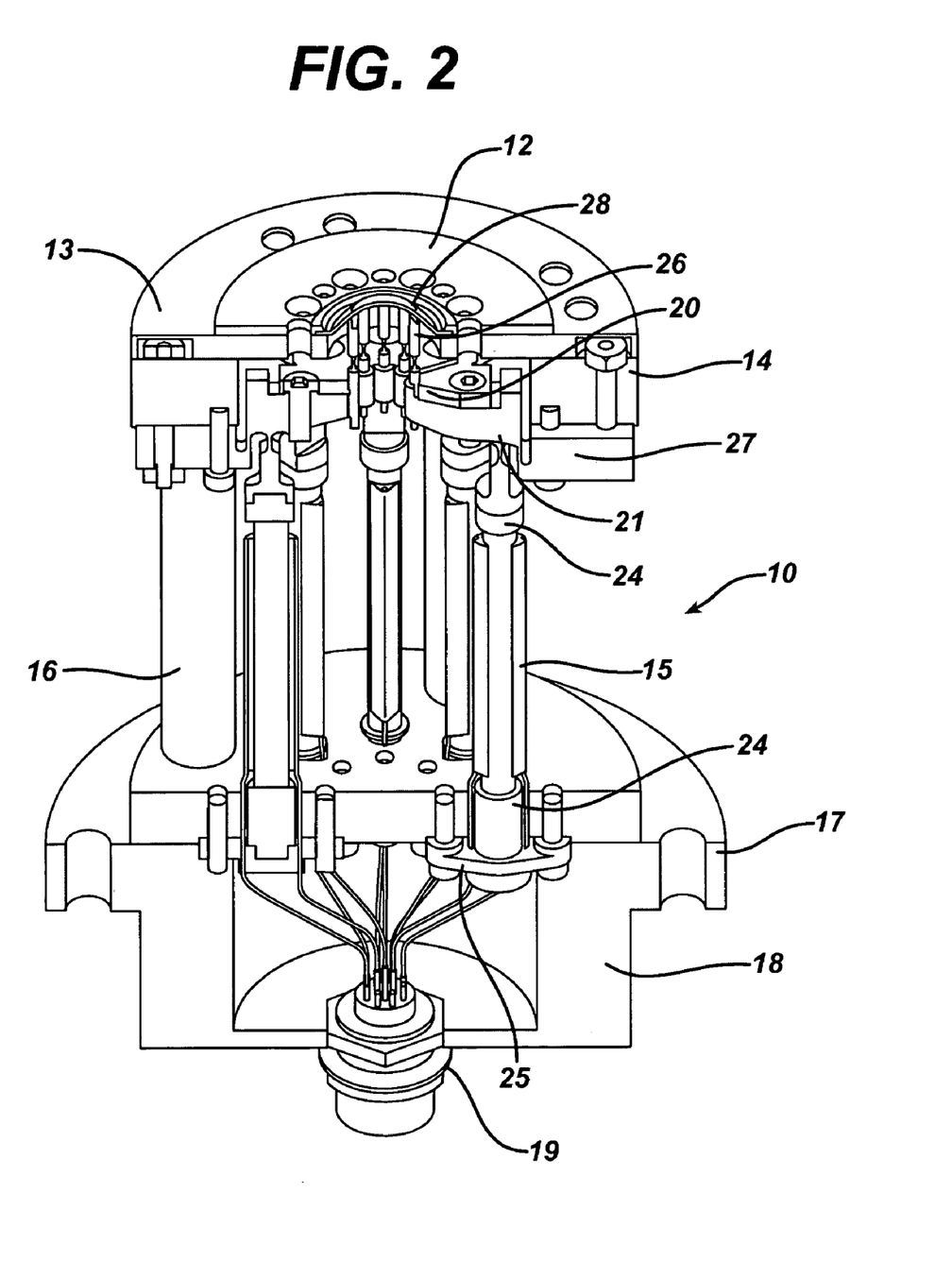
FIG. 2 is an elevated cross-sectional view of the mold of FIG. 1.

FIG. 2 is a cross-sectional view of the mold of FIG. 1. At either end of micro-actuators 15 are attached mounting tabs 24. At the inferior end of actuator 15, mounting tab 24 attaches to actuator mounting bracket 25, which is attached to mounting plate 17. Preferably, mounting bracket 25 is removably attached to mounting plate 17 allowing for removal of individual actuators from the mold half. At the superior end of the actuator 15, mounting tab 24 attaches the actuator to mechanical lever 21, which mechanical lever 21 is shown in close-up in FIG. 3.

For purposes of this embodiment of the invention, the micro-actuators preferably are made from an electro-restrictive material. Electro-restrictive materials are materials that are capable of expanding, or exhibiting strain, when an electric field is applied across the material.

Figure 3:
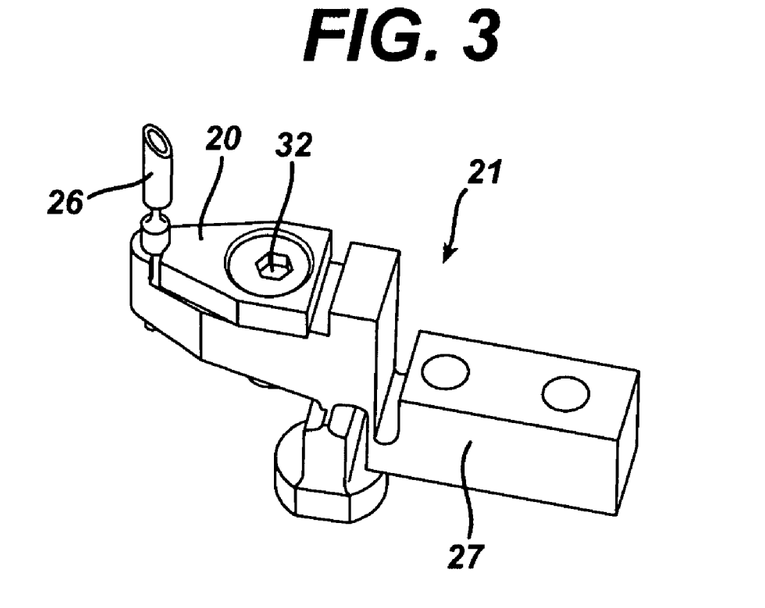
FIG. 3 is an elevated side view of a portion of the mold of FIG. 1.

As shown in FIG. 3, mechanical lever 21 contains pivot point 27 that attaches lever 21 to flexure mounting plate 14. Micro-clamp 20 in mechanical lever 21 is used to hold pusher pin 26 in place so that when the mold is being utilized, mechanical lever 21 can make a connection between pusher pin 26 and actuator 15 through flexure plate 14. More specifically, in response to the actuator, mechanical lever 21 moves the pusher pin upwardly so that the pusher pin exerts pressure on the non-molding surface of the casting cup.

Figure 4:
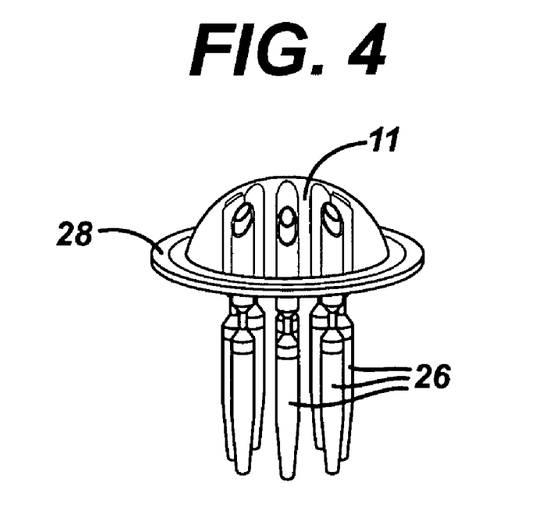
FIG. 4 is an elevated side view of an embodiment of a casting cup used in the mold of FIG. 1.

In FIG. 4 is shown lens casting cup 28 used in the mold half of FIG. 1. The shown casting cup 28 has a front to back surface thickness of approximately 0.6 mm. Casting cup 28 has lens molding surface 11 and a non-molding surface opposite the molding surface. Pusher pins 26 are removably attached to the non-molding surface of casting cup 28 prior to use of the mold. In the embodiment shown, the pusher pins are evenly spaced along a 9 mm diameter circle that is concentric with the optical axis of casting cup 28. However, one ordinarily skilled in the art will recognize that the number of pusher pins 26 used will be determined by a consideration of a variety of factors including the design desired to be imparted to molding surface 11, size of the pusher pins 26, thickness of the casting cup 28, and the molding surface 11 material.

Casting cup 28, molding surface 11, and the non-molding surface preferably are made from STYROLUX™, a polystyrenebutadiene available commercially from BASF. Preferably molding surface 11, and more preferably the entire casting cup 28, are made from a material that is compatible with the lens forming material to be used and has the following properties: an elastic modulus of about 1,250 psi to about 5,250 psi (accroidng to ASTM D 638-01, cross head speed 0.2 to 2 in./min., yield stress determined at yield point, elongation determined at yield point, and modulus measured between 0.0005 and 0.005 strain); a yield point such that at the material recovers its original shape after being subjected to strains that change the original shape by at least 5%; a yield stress of greater than about 1500 psi, preferably greater than about 5000 psi, more preferably greater than about 16,000 psi measured according to ASTM D 638-01; and a light transmittance in the range of about 100 to about 400 nm, preferably about 290 to about 400 nm. Suitable materials meeting these criteria include, without limitation, STYROLUX, polypropylene, poly(vinylidene fluoride), poly(vinyl chloride), and the like and combinations thereof. Molding surface 11 preferably has a RMS roughness of about 25±5 nm or less and a surface energy of about 30±2 dynes/cm or less. Casting cup 28 may be made by any convenient manufacturing method, but preferably is injection molded.

Figure 5:
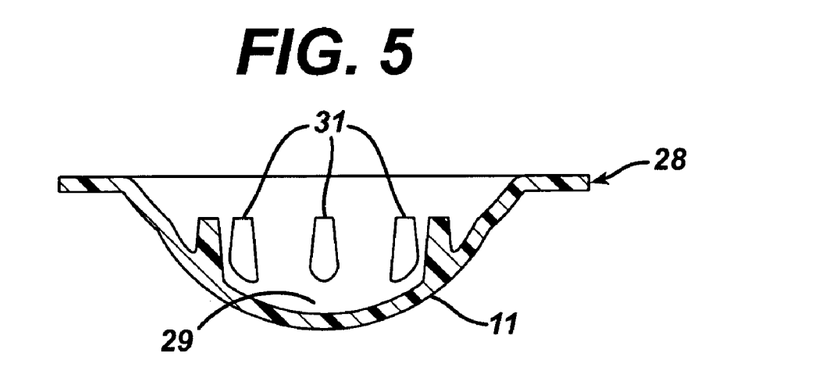
FIG. 5 is a cross section of another embodiment of a casting cup used in the mold of FIG. 1.

In a preferred embodiment, casting cup 28 includes pusher pads 31 on non-molding surface 29 as shown in FIG. 5. In this embodiment, each of pusher pins 26 attaches to casting cup 28 at a pusher pad 31. The pusher pads provide increased surface area to facilitate connection of the pusher pins to casting cup 28.

Figure 6:
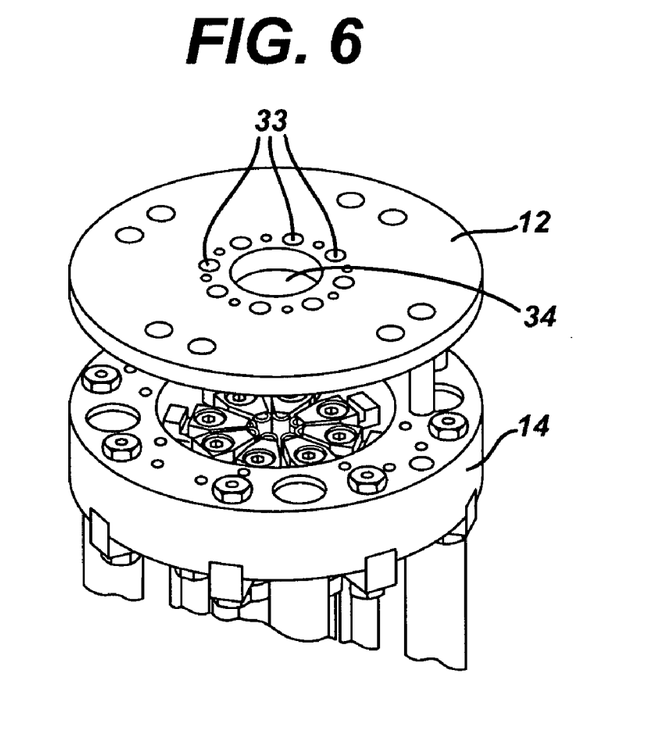
FIG. 6 is an elevated side view of a mold tray useful in the mold of FIG. 1.

In operating the mold half of FIG. 1, pusher pins 26 are attached to non-molding surface 29 of casting cup 28. The desired number and placement of the pusher pins will depend upon the lens geometry desired. The casting cup is then seated in opening 34, of mold tray 12, and the lower portions of the pusher pins are put through holes 33 of mold tray 12 and into a micro-clamp 20, which opening 34 and holes 33 are shown in the elevated side view of mold tray 12 in FIG. 6. Clamping plate 13 is then attached and cam screw 32 of micro-clamp 20 is tightened to a desired torque to hold pusher pin 26. Preferably, micro-actuators 15 are biased to about ½ of their full voltage before the cam screw is tightened so that the actuators will contract and a pulling force will be exerted on molding surface 11 when the voltage is lowered.

Figure 7:
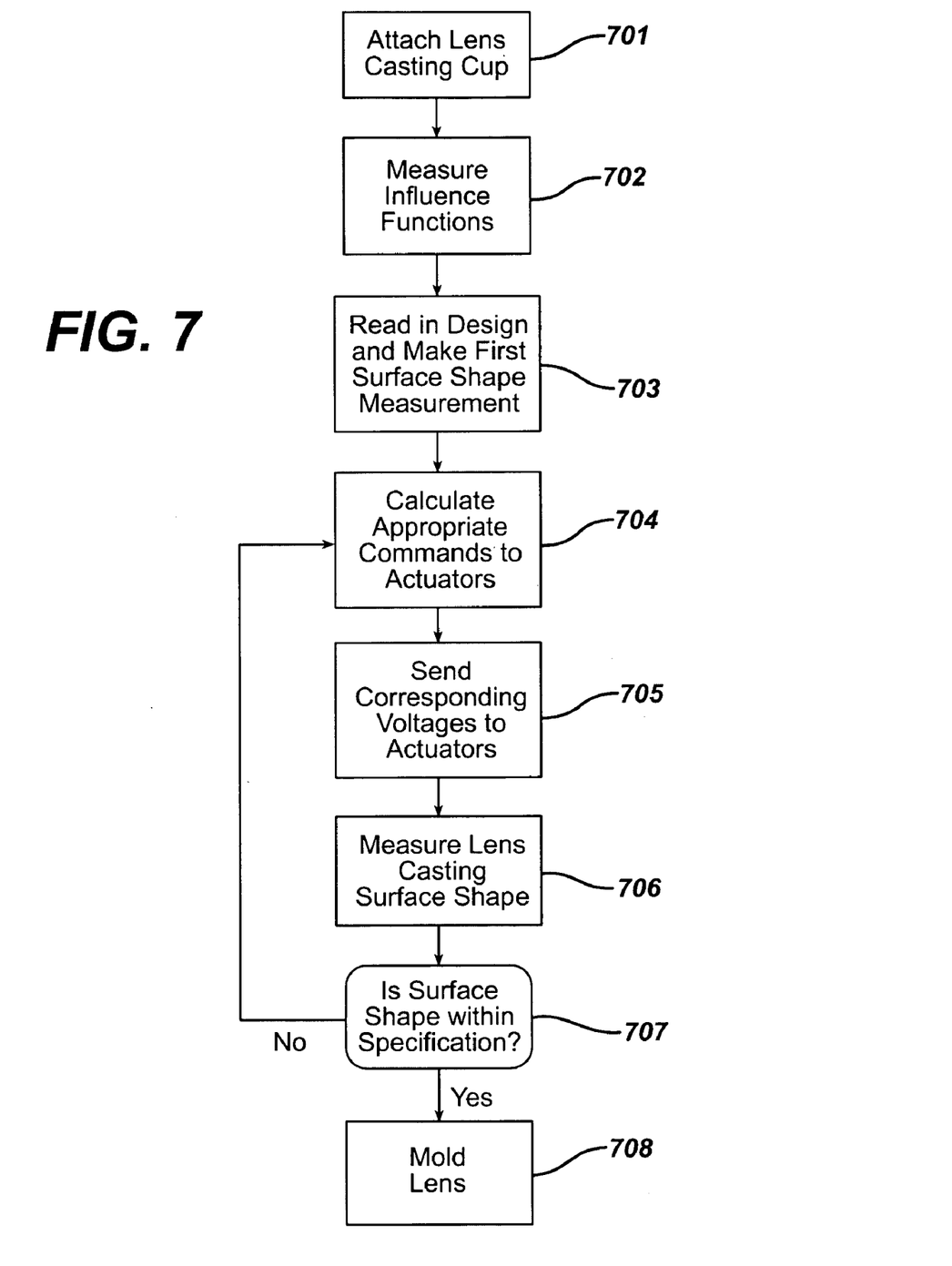
FIG. 7 is a flow diagram of a process for molding a lens using the mold of FIG. 1.
Figure 8:
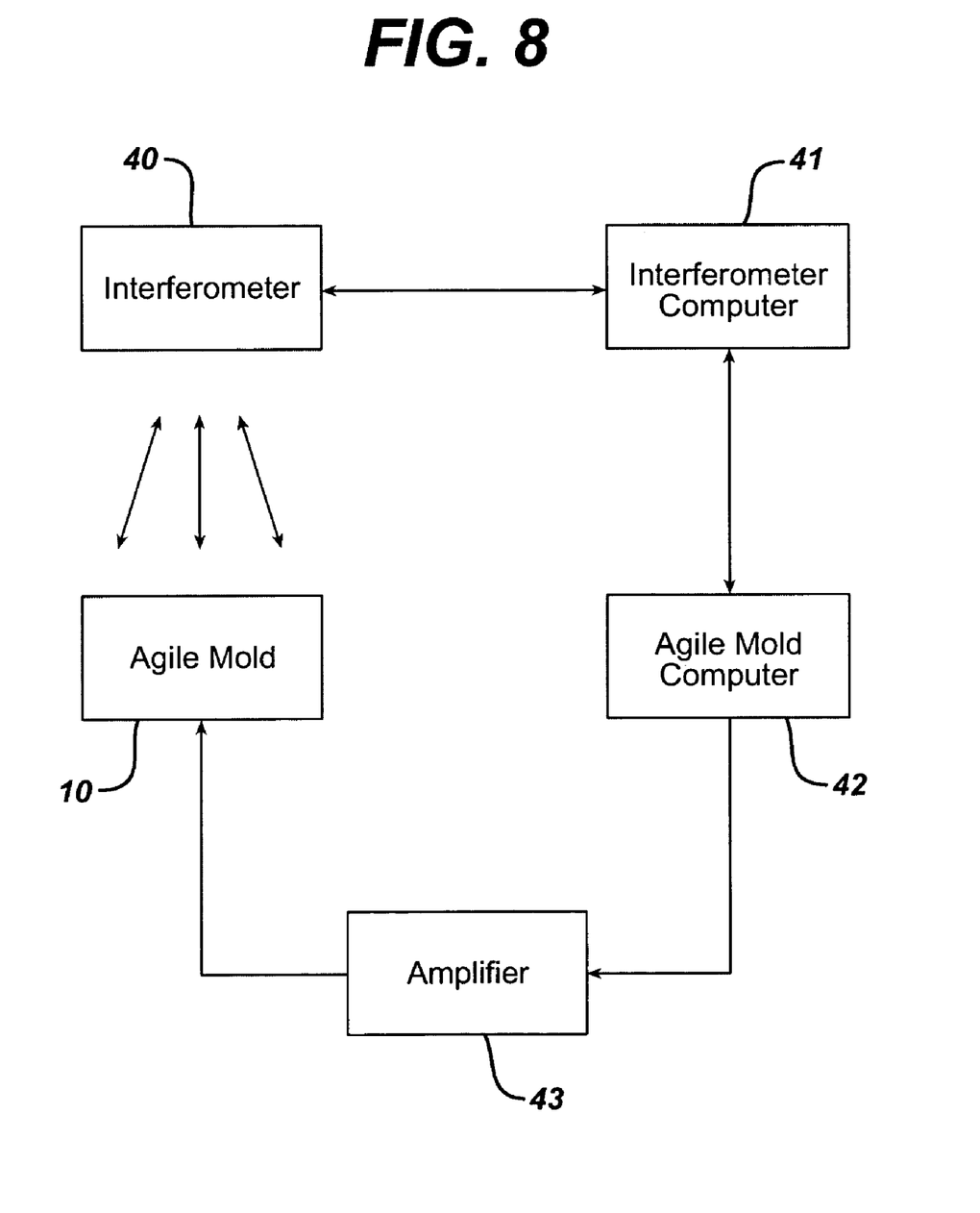
FIG. 8 is a diagram of electronic equipment used in one embodiment of a method for using the mold of FIG. 1.

A flow diagram of a process for molding a lens using lens mold 10 is shown in FIG. 7. Once the casting cup 28 is in place (701), a measurement of the global deformation, or influence function, of the mold surface is carried out (702) using an interferometer. In step 703, the desired lens design is uploaded and a first measurement is made of molding surface 11 using any suitable measuring device. Referring to FIG. 8, a preferred device for measuring molding surface 11 is a phase-shifting interferometer such as a Zygos HS GPI 1000. Interferometer 40 measures the shape of the wave front associated with molding surface 11 and provides this information to a mold computer 42. The computer may be any commercially available computer equipped with a National Instruments Board PCI6703 Static Analog Voltage Output 16 bit ±10V. Mold computer 42 compares the measured shape with the desired shape and, in step 704, calculates the commands for amplifier 43 to provide the appropriate voltage to micro-actuators 15 to change the shape of molding surface 11. Once the voltage has been sent, step 705, to micro-actuators 15, in step 706 a second measurement of molding surface 11 is made using interferometer 40. A determination is made in step 707 as to whether molding surface 11 is the desired shape. If the desired shape has been attained, mold 10 is ready to be used to cast lenses in step 708. If the desired shape has not been attained, steps 704 through 707 are repeated until that shape is attained. The software useful for carrying out this process is known as, for example, commercially available software such as MATLAB™.

It may be assumed that each point on molding surface 11 overlaying a micro-actuator 15 would be moved to a location dictated solely by the desired molding surface design and location of the actuator. In that case, many actuators would be necessary and the molding surface would need to be of a stiffness such that the surface deformations brought about by the actuators are local. However, it is one discovery of the invention that one need not rely on moving each micro-actuator to a location coincident with the design being replicated on the molding surface. Rather, by selecting the molding surface so that it has a modulus and thickness that, when deformation is caused by a micro-actuator, the deformation is not local, complicated surfaces may be replicated on the molding surface through the linear combination of the deformations of a few micro-actuators, or degrees of freedom.

To determine how much each micro-actuator is to be moved so that the sum of the deformations combines to replicate the desired, shape, or design, on the molding surface, the design may be treated as a vector and the deformations of each actuator as a basis vector. The extent to which the micro-actuators need to be moved, or voltage required, thus can be determined using linear algebra and Least-Squares curve fitting. In carrying out this method, first the deviation of each actuator as a function of the applied bias voltage is measured. Typically, this curve is non-linear, but can be made linear using a high order polynomial transfer function that maps the actual applied bias voltage to a dummy voltage with the deviations being a linear function of the dummy voltage.

The deformation of the entire molding surface due to a particular actuator is measured as a function of the dummy voltage. The shape of this global deformation, or influence function, depends on the mechanical properties and thickness of the casting surface along with the manner in which the actuator is attached to the non-molding surface, the molding surface geometry, and the location of the actuator. It is assumed that the influence function varies linearly with the dummy voltage.

As an example, it is desired to replicate a design inversely corresponding to an individual eye's corneal topography using a mold employing eight micro-actuators. In this case, the molding surface's design may be described as a grid that is composed of 28 equally spaced concentric circles and 24 radial meridians. This grid is selected based on a consideration of the resolution of the device used to measure the topography of the eye, 28 circles used by the Keratron, and the device used to make mold inserts, 24 meridians used by VariForm lathe.

Each design may be thought of as a 672 row vector (28× 24=672), which is referred to as D. The influence functions may be thought of as a set of basis vectors from which, in principle, the design may be constructed by a proper choice of coefficients. For example, consider each of the eight influence vectors, based on the use of 8 actuators, as a 672×1 column vector and that these may be arranged as the columns of a 672×8 matrix, referred to as R, the influence factors being a response to a limit value of the dummy voltage. Thus, a particular design may be given as:

$$D=RA \qquad (V)$$

and is solved for A using a Least-Squares method that determines the values of A that minimize the norm of the vector D−RA. For purposes of the equation, A is an 8 by 1 column vector of the dummy voltages. To generate a particular design D, each actuator i is biased at a voltage given by the Equation:

$$V_i = g^{-1}(A_i) \qquad (VI)$$

wherein $A_i$ is the elements of the matrix A given by A= $(R^T R)^{-1} D$; and g is a function that maps the real voltage to a dummy voltage. The above Least-Squares problem also may be solved using QR or singular value decomposition. Alternatively, the problem may be reformulated as a weighted Least-Squares problem with weight given to particular points on the grid.

Alternatively, actuator movement may be determined by techniques useful in controlling deformable mirrors. The deformation of the molding surface due to an individual micro-actuator, or influence function, may be measured and decomposed into Zernike components so that:

$$INF_i = \Sigma s_j Z_j \qquad (VII)$$

wherein
INF is the influence function;
i is the ith micro-actuator influence function;
$s_j$ is the coefficient of the jth Zernike polynomial; and the sum is over N Zernike terms.

Each influence function can be though of as a 1×N vector in which the corresponding Zernike coefficients are the vector components. These influence functions may be arranged into a matrix, R, in which the columns of the matrix are the transpose of the INF vectors:

$$R=(INF_1^T INF_2^T \ldots INF_N^T) \qquad (VIII)$$

A particular mold design, D, may be thought of a N×1 vector similar to that described for the influence functions. That is, the design is decomposed into N Zernike terms and the Zernike coefficients are then the vector components where the Zernike coefficients are not necessarily the same as those found for the influence functions.

The voltage that needs to applied to each micro-actuator may be found by determining the components of the vector, V, that minimize the norm of the vector equal to RV−D, where V is a N×1 vecotr the components of which are the voltages to which each micro-actuator is to be set in order to replicate the design. This may be carried out by using any convenient method including, without limitation, QR decomposition or singular value decomposition.

In practice, the influence functions may not be linearly independent. Additionally, there may be some hysteresis in the stroke of the actuator and some creep in the molding surface material. Thus, a feedback loop between a device suitable for measuring the surface, or associated surface wavefront, such as an interferometer, and the routine that controls the actuators may be used to alleviate these problems.

The fit for a design is performed over some aperture, typically about 6 mm to about 7 mm. The solution to the above equation is arrived at iteratively with the convergence criteria set by either a minimum RMS error or maximum number of iterations.

The molds of the invention may be composed of two mold halves, each of which has a deformable molding surface. Alternatively, one mold half may have a deformable mold surface and the other mold half may have a fixed molding surface. For the mold half of FIG. 1, the complementary mold half preferably is a polypropylene mold half. Suitable methods and materials for forming such fixed molding surfaces are well known in the art. The mold halves may be brought into contact for purposes of molding the lens using any suitable contacting means including, without limitation, stepper motors, screw drives, or the like, and combinations thereof. When positioned for molding of the lens, the mold halves may contact one another. In this case, preferably a sealing means is used to seal the molds so that an acceptable lens edge is formed. Suitable sealing means include, without limitation, a gasket, o-ring, and the like, and combinations thereof. If the mold halves do not contact each other, preferably a mask is used to expose only those areas at which polymerization is desired The mold halves and molds of the invention may be supported by any suitable support means. Supporting means include, without limitation, a pallet, a support frame, a case, or the like, and combinations thereof.

Figure 9:
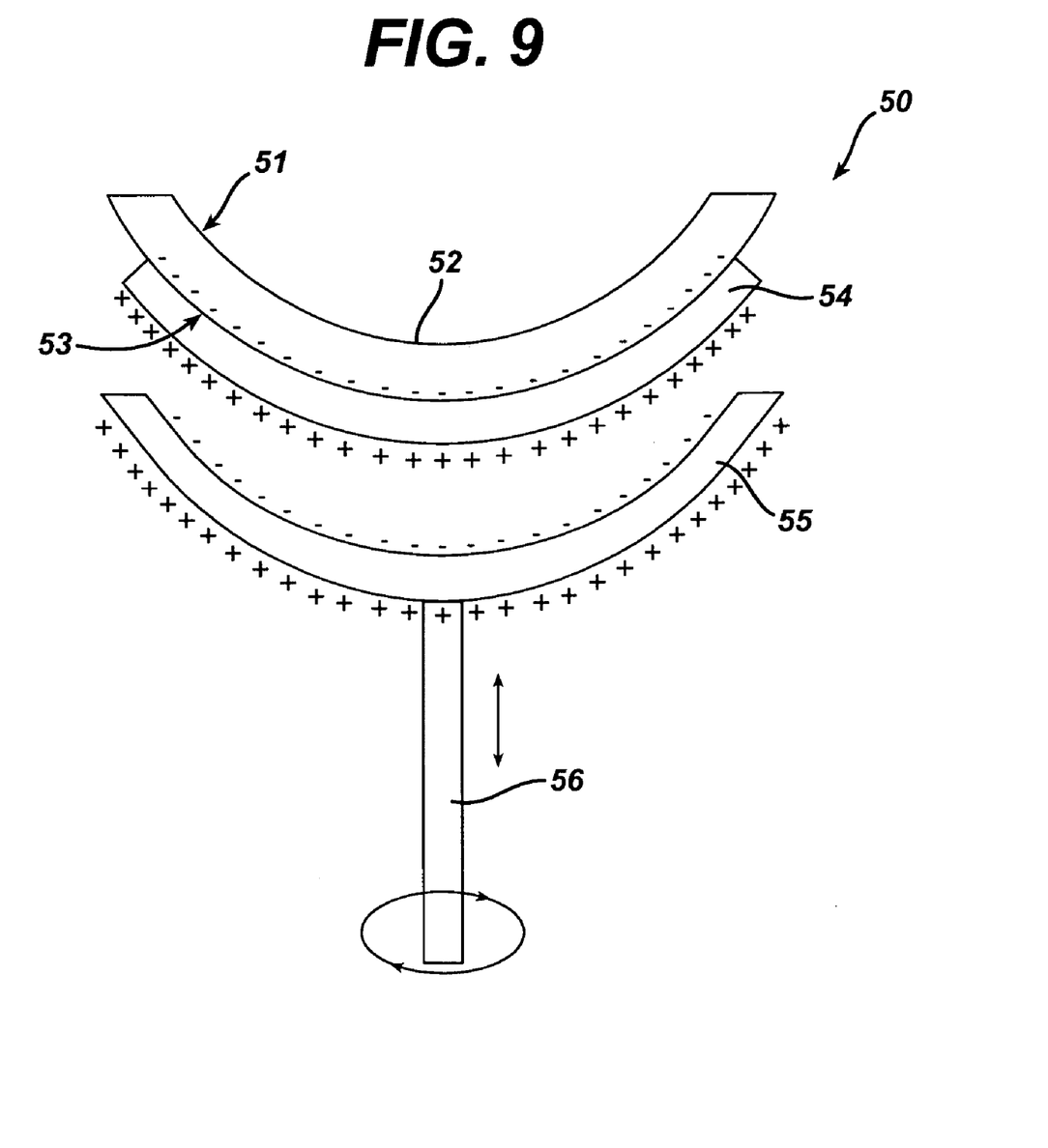
FIG. 9 is a second embodiment of a mold of the invention.

In FIG. 9 is shown mold 50, an alternative embodiment of the invention in which a the adjustment means is a magnetic field deformation means. Molding surface 51 has deformable portion 52 thereon. Non-molding surface 53 has in contact with it first magnetic material 54. Second magnetic material 55 is brought into proximity of first magnetic material 54 by mechanical arm 56, which arm is movably mounted so that it can be manipulated in the directions shown by the arrows. A magnetic force is exerted by second magnetic material 55 resulting in the deformation of first magnetic material 54 and deformable molding surface 52.

Preferably, the molds of the invention are contained within a structure, such as a chamber, in which temperature, atmosphere, and pressure are controlled. Additionally, the enclosure will contain the source for curing of the lens material, such as a UV light source. Also preferably, a feed back mechanism, such as an interferomic technique, is used to feed information back to the adjustment means regarding the position and shape of the molding surface, the non-molding surface, or both.

Figure 10:
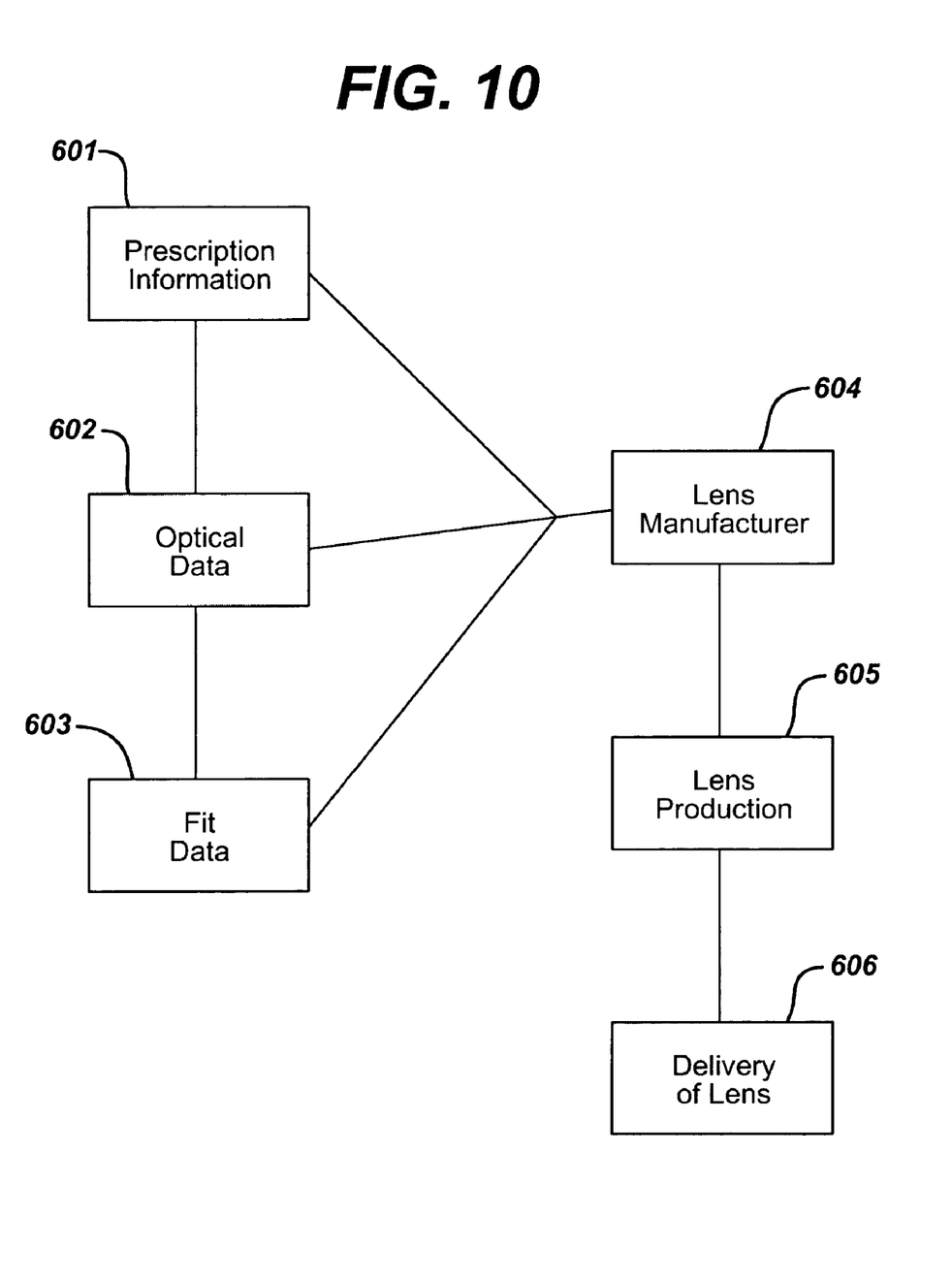
FIG. 10 is a flow diagram of a process for using the mold of the invention.

The mold of the invention may be used to provide any ophthalmic lenses suitable to correct visual acuity defects. However, the molds of the invention may find particular utility in providing lenses customized to correct the aberrations, both low and high order, of a specific lens wearer. FIG. 10 is a flow diagram of a method for providing such lenses using the molds of the invention.

In step 601 of the method, a lens wearer's prescription information is determined. By "prescription information" is meant information necessary to correct the low order aberrations of the lens wearer. This information includes, without limitation, sphere, cylinder, axis, add power, and the like, and combinations thereof. The information may be obtained using conventional ocular measuring devices or, and preferably, by use of wavefront sensors. Optionally and preferably, in step 602, optical data is determined for the lens wearer. "Optical data" means measurement of higher order ocular aberrations. Such data is obtained using wavefront sensors. Finally, optionally and preferably, patient fit data is determined in step 603. For contact lenses, such data will include, without limitation, corneal topographic measurements of the lens wearer's cornea. For spectacle lenses, such information will include, without limitation, fitting height, distance zone pupillary distance, and the like, and combinations thereof.

The prescription information, optical data, and patient fit data (collectively, the "order information") is then sent to the lens manufacturer (604) by any convenient ordering means including, without limitation, telephone, facsimile transmission, internet website, and the like and combinations thereof. In a preferred embodiment, ordering is carried out via the lens manufacturer's internet website by the customer using any means capable of communicating with the lens manufacturer's server system (web server or web site). Suitable means for communicating with the website include, without limitation, a personal computer and modem. Thus, in yet another embodiment the invention provides a method for producing customized ophthalmic lenses comprising, consisting essentially of, and consisting of the steps of: a.) transmitting, by a customer using a computer system, to a lens manufacturer's server system lens order information; b.) manufacturing by the lens manufacturer the lenses using a mold for comprising, consisting essentially of, and consisting of i.) at least one mold half comprising, consisting essentially of and consisting of a non-molding surface and a molding surface, wherein at least a portion of the molding surface is capable of being reversibly deformed and ii.) adjustment means for reversibly deforming the deformable portion of the molding surface (605); and c.) delivering by the lens manufacturer directly to the customer the lenses (606).

In carrying out manufacturing of the lenses, the lens manufacture uses the order information, in whole or in part, to drive the adjustment means of the deformable molds of the invention to manufacture the wearer's lens. By "customer" is meant an orderer of spectacle lenses. Examples of lens orderers include, without limitation, ophthalmologists, optometrists, opticians, lens retailers, lens wearers, and the like. Preferably, the method of the invention is carried out so that it is a business-to-business system.

What is claimed:

1. A mold for use in the manufacture of ophthalmic lenses, comprising:
   a.) at least one mold half comprising a casting cup having (i) a non-molding surface having a plurality of pusher pins attached thereto, and (ii) a molding surface, wherein at least a portion of the molding surface is capable of being reversibly deformed; and
   b.) adjustment means for reversibly deforming the deformable portion of the molding surface, the adjustment means comprising a plurality of micro-actuators wherein each of the micro-actuators has at one end thereof a mechanical lever capable of moving one of the plurality of pusher pins so that the pusher pin exerts a pressure on the non-molding surface.

2. The mold of claim 1, wherein the mold is a contact lens mold.

3. The mold of claim 1, wherein the entire molding surface is capable of being deformed.

4. The mold of claim 1, wherein the micro-actuators are electro-resistive microactuators.

5. The mold of claim 4, wherein the micro-actuators comprise a material selected from the group consisting of lead-magnesium-niobate, lead-magnesium-niobate-titanate, an electrorestrictive polymer and combinations thereof.

6. The mold of claim 1, wherein the molding surface comprises a material selected from the group consisting of polystyrenebutadiene, polypropylene, poly(vinylidene fluoride), poly(vinyl chloride) and combinations thereof.

7. The mold of claim 6, wherein the molding surface comprises a polystyrenebutadiene.

8. The mold of claim 1, wherein the non-molding surface further comprises a plurality of pusher pads.

9. The mold of claim 1, wherein the mechanical lever further comprises a micro-clamp.

10. A mold for use in the manufacture of contact lenses, comprising:
  a.) at least one mold half comprising a casting cup having a non-molding surface having a plurality of pusher pins attached thereto, and
    (ii) (ii) a molding surface, wherein at least a portion of the molding surface is capable of being reversibly deformed; and electro-resistive micro-actuators for reversibly deforming the deformable portion of the molding surface, each of the micro-actuators has at one end thereof a mechanical lever capable of moving one of the plurality of pusher pins so that the pusher pin exerts a pressure on the non-molding surface.

11. The mold of claim 10, wherein the entire molding surface is capable of being deformed.

12. The mold of claim 10, wherein the micro-actuators comprise a material selected from the group consisting of lead-magnesium-niobate, lead-magnesium-niobate-titanate, an electrorestrictive polymer and combinations thereof.

13. The mold of claim 10, wherein the molding surface comprises a material selected from the group consisting of polystyrenebutadiene, polypropylene, poly(vinylidene fluoride), poly(vinyl chloride), and combinations thereof.

14. The mold of claim 12, wherein the molding surface comprises a material selected from the group consisting of polystyrenebutadiene, polypropylene, poly(vinylidene fluoride), poly(vinyl chloride), and combinations thereof.

15. The mold of claim 10, wherein the molding surface comprises a polystyrenebutadiene.

16. The mold of claim 12, wherein the molding surface comprises a polystyrenebutadiene.

17. The mold of claim 10, wherein the non-molding surface further comprises a plurality of pusher pads.

18. The mold of claim 16, wherein the non-molding surface further comprises a plurality of pusher pads.

* * * * *